United States Patent Office 2,989,563
Patented June 20, 1961

2,989,563
PRODUCTION OF ESTERS
Jennings H. Jones and Merrell R. Fenske, State College, Pa., assignors to Esso Research and Engineering Company, a corporation of Delaware
No Drawing. Filed July 24, 1958, Ser. No. 750,599
7 Claims. (Cl. 260—496)

This invention relates to the preparation of oxygenated organic compounds from certain epoxy compounds obtainable by partial oxidation of hydrocarbons. More particularly, this invention relates to the production of acyclic esters from heterocyclic cyclic compounds such as substituted tetrahydrofuran and related epoxy compounds. Additionally, other oxygenated compounds are produced by this process. More specifically, the process of this invention comprises reacting the epoxy type compound with an oxidizing agent to produce the organic peroxide which is subsequently reacted with a reducing agent under certain conditions to cleave the ring structure and to produce the desired acyclic ester.

By the partial oxidation of hydrocarbons in a catalytic or noncatalytic process there are formed various types of olefinic and oxygenated compounds, and among the oxygenated compounds there are produced epoxy compounds having the following generic formula:

FORMULA 1

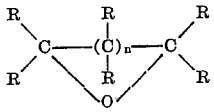

wherein $n$ is an integer from 0 to 6 and wherein R represents a hydrogen or an alkyl radical from 1 to 20 carbon atoms. For purposes of this invention, however, compounds within the scope of the above formula which are operable have a total of less than 40 carbon atoms and the longest alkyl chain is less than 20 carbon atoms. Further, in accordance with this invention at least one of the carbon atoms bound to the oxygen atom must contain a tertiary hydrogen atom. For example, 2-methyltetrahydrofuran has one carbon atom bound to the oxygen atom containing a tertiary hydrogen atom, while the other carbon has two secondary hydrogens. The carbon atoms adjacent the oxygen atoms will be referred to herein as alpha carbon atoms. Similarly, 2,5-dimethyltetrahydrofuran has two carbon atoms, each containing a single or tertiary hydrogen atom.

The following formula represents the preferred epoxy compounds amenable to the present process:

FORMULA 2

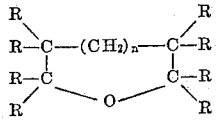

wherein $n$ is equal to 0 or 1 and R is as defined above. Also, as in the above general formula, at least one of the carbon atoms adjacent the oxygen atom must contain a tertiary hydrogen atom.

It has been found that the epoxy compound may be treated with an oxidizing reagent such as oxygen, oxygen-containing gases including air, ozone-containing gases, or other chemical oxidizing reagents such as hydrogen peroxide, dilute nitric acid, chlorine water, sodium hypochlorite, selenium dioxide and dilute chromic acid to produce the organic peroxide as represented by the following general equation:

FORMULA 3

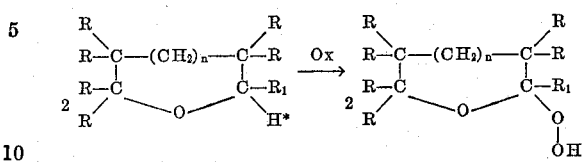

*Tertiary hydrogen atom.

wherein R and $n$ are as described above and $R_1$ is an alkyl radical. The oxidation, however, must be carried out with care over controlled conditions to avoid a thermal decomposition of the epoxide or the hydroperoxide which may result in the formation of alcohols, ketones or glycols. Subsequently the peroxide in accordance with this invention is reacted with a reducing agent which may be ferrous sulfate, sodium sulfite, hydrogen, sodium and an alcohol, sodium hydrosulfite, or iron and hydrochloric acid, either catalytically or noncatalytically to effect a splitting of the ring structure and to produce the corresponding ester along with minor amounts of other oxygenated compounds including alcohols, ketones, glycols and the like. This second reaction may be represented by the following equation with the $n$ and R's as described above:

FORMULA 4

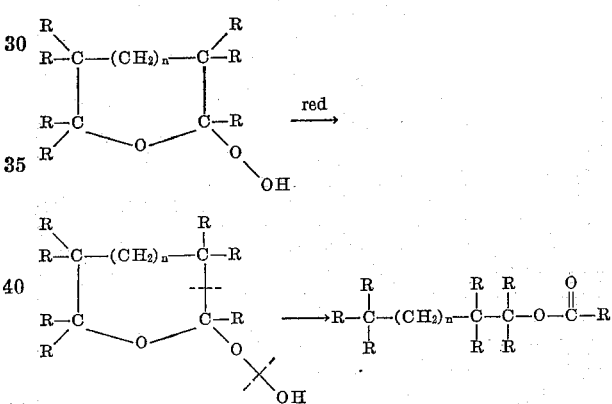

In another embodiment of this invention the oxidation and reduction steps are combined into a single operation by using the proper combination of reagents. For example, the epoxide may be treated simultaneously with a mixture of oxidizing and a reducing agent; such combinations are: ferrous sulfate-oxygen or air, ferrous sulfate-hydrogen peroxide, and other oxidizing-reducing agent combinations which will be apparent to those skilled in the art.

Thus, there is presented a simple straightforward technique for the production of open chain esters from cyclic heterogeneous compounds. Appreciable amounts of secondary alcohol are also formed. For example, from 2,5-dimethyltetrahydrofuran there is produced in appreciable quantities 2-pentanol, a secondary alcohol having one less carbon atom than the starting epoxy compound. Although some ketone and glycol are formed during the process, the major product is the ester. While it is preferred to carry out the oxidation step at a temperature between 10 to 30° C., a relatively broad range of —10° C. to the boiling point of the epoxide or solution has been found suitable. Although atmospheric pressure is normally employed for the oxidations, pressures of the order of 50 to 200 p.s.i.g. also are useful if higher temperatures or higher oxidation rates are desired. Also if desired, the unstable epoxy compounds may be oxidized over a long period of time by mere contact with the atmosphere. In a commercial system, however, the oxidation rate is preferably increased by the use of an oxygen containing gas at temperatures of 0 to 100° C. or to the boiling point of the epoxide in the presence of an oxidation catalyst such as copper, cobalt, vanadium, manganese and their salts.

A solvent such as an alcohol, a hydrocarbon, a chlorinated hydrocarbon, an excess of the epoxide, or of an aqueous medium may be employed during the oxidation step. Organic acids such as acetic acid are not desirable, however.

After the peroxide is formed by peroxidation of the epoxide, the peroxide may be separated from the remainder of the solution which will comprise essentially the original epoxy compound and/or solvent if one is used. Fractionation, extraction, adsorption, or any known technique for the separation of a peroxide from epoxy compounds may be employed; however, when the unreacted epoxy compound remaining does not seriously interfere with the subsequent reaction, it is more convenient to further treat the peroxide in the presence of the epoxide. The peroxide containing solution is therefore then treated with the reducing agent at a temperature preferably between 10 to 40° C., although a broader temperature range of 0 to 100° C. is also acceptable. The reducing reaction may of course be speeded up by intimate contact with the reducing agent by such means as agitation, bubbling through a reducing gas in an apparatus which is designed for good gas-liquid contact, the use of a catalyst such as nickel, Raney nickel, copper chromium oxide, platinum, and other means which will be apparent to those skilled in the art. The oxygenated compounds produced from the initial epoxides and containing the desired acyclic esters are then separated from the reaction mixture by a relatively crude distillation. The desired product may then be fractionated or distilled in an efficient fractionating column for the purpose of isolating the desired ester product as well as the remaining oxygenated compounds noted above.

With an aqueous reducing agent such as aqueous ferrous sulfate, the total reaction mixture will separate into two phases. The bulk of the desirable oxygenated products will be contained in the organic layer although some ester and alcohol product will be in the aqueous layer along with small amounts of unreacted epoxy compound. Tetrahydrofuran and derivatives thereof may be recovered from the water layer by steam distillation.

While the process in the examples which follow is described in batch operation for the production of the ester compounds, it is to be understood that a continuous process may be and preferably would be employed for a commercial design.

*Example 1*

1800 grams of pure 2,5-dimethyltetrahydrofuran obtained by the noncatalytic partial oxidation of hexane, was peroxidized by mere exposure to air at ambient conditions for a period of several months.

Analysis of the peroxide containing solution showed 30% peroxide ($C_6H_{12}O_3$), with the remainder being essentially unreacted dimethyltetrahydrofuran. As noted previously, the peroxidation may be speeded up considerably by bubbling air through the epoxide solution, use of a catalyst, or other equivalent means.

The peroxidic solution obtained above was contacted with an excess of a saturated aqueous solution of ferrous sulfate added in several portions during the progress of the reaction and the reaction mixture was agitated until analysis showed that the peroxide had disappeared (negative test with potassium iodide). The reduction of the peroxide is an exothermic reaction; however, the reaction was controlled to maintain the temperature between about 25 to 35° C. Reduction with ferrous sulfate required several hours and resulted in an organic layer totaling 1500 grams. The reaction mixture was washed with water to remove iron salts and some smaller amounts of unreacted dimethyltetrahydrofuran. The organic layer was analyzed as indicated below.

| Portion | Weight, grams | B.P. Range, ° C. | Contents |
| --- | --- | --- | --- |
| A | 31 | below 82° | Water. |
| B | 915 | 88 to 91 | recovered unreacted 2,5-dimethyltetrahydrofuran ($n_D^{20}$ 1.4033 to 1.4043). |
| C | 542 | above 91 | higher boiling oxygenated compounds. |
|  | 1,488 |  |  |

The material in Portion C was further divided by means of a simple distillation as follows:

| Portion | Weight, grams | B.P. Range, ° C. |
| --- | --- | --- |
| C-1 | 328 | 92 to 125 |
| C-2 | 214 | above 125 |
|  | 542 |  |

FRACTIONATION OF PORTION C-1 PRODUCTS

The product isolated above as portion C-1 was carefully distilled through an efficient fractionation column whereby the following materials were isolated:

| Volume, ml. | Vol. percent of Charge | B.P. Range, ° C. | Contents |
| --- | --- | --- | --- |
| 104 | 28.2 | 89 to 104 (mainly 89-89.5). | unreacted dimethyl-tetrahydrofuran. |
| 171 | 46.3 | 104 to 108 (mainly 108). | sec-butyl acetate. |
| 94 | 25.5 | above 108 |  |
| 369 | 100.0 |  |  |

The principal product as noted from the table above was secondary butyl acetate which was recognized by means of its infrared absorption spectra which was identical with that of an authentic sample of the ester. Also a portion of the secondary butyl acetate was saponified to produce secondary butyl alcohol and acetic acid which were identified by routine analytical methods. The portion identified as C-2 also contained some secondary butyl acetate with some 2-pentanol and some 2,5-hexanedione which were identified by routine analysis. While the example employed dimethyltetrahydrofuran as the initial reactant, other typical compounds which come within the scope of Formula 1 above include 2-methyltetrahydrofuran, 2-methyl-5-ethyltetrahydrofuran, 2,3,4,5-tetramethyltetrahydrofuran, as well as the higher alkyl substituted tetrahydrofurans such as 2-methyl-4-ethyl-5-octyltetrahydrofuran, 2-methyl-5-amyl tetrahydrofuran, 2-propyl tetrahydrofuran and 2-methyl-5-undecyltetrahydrofuran. The cyclic epoxides having the pyran structure are also amenable to this reaction and typical compounds of this group include 2-methyltetrahydropyran, 2,6-dimethyltetrahydropyran, tetrahydropyran, 2-hexyltetrahydropyran, 2,2,6 - trimethyltetrahydropyran and 2-methyl-6-undecyltetrahydropyran. Other compounds include 1,3-epoxyhexane, 2,4-epoxyhexane, 3,4-epoxyheptane, 2,4-epoxydecane, 1,2-epoxyhexane, 1,3-epoxy-2,4,4-trimethylpentane, 2,3-epoxy-2,4-4-trimethylpentane, 1,2-epoxydecane and 2,4-epoxyhexadecane. All of the compounds are homologs having at least one hydrogen atom on the alpha carbon atoms in the ring structure.

It is to be understood that a mixture of various epoxy compounds having the same or different molecular weights may be employed in lieu of a single compound. When mixtures are employed, the resultant esters will correspond to the individual epoxy compounds in the starting feed.

Example 2

633 grams of 2,5-dimethyltetrahydrofuran were peroxidized as in Example 1 and treated with an excess of a saturated aqueous solution of ferrous sulfate.

In this example the peroxidation step was shortened in time so that the product before reduction comprised approximately 15% peroxide with approximately 85% unreacted epoxy compound. The organic layer after water washing had the following analysis:

| | Percent by wt. |
|---|---|
| Unreacted dimethyltetrahydrofuran | 83 |
| Sec-butyl acetate | 13 |
| Higher boiling products | 4 |
| | 100 |

In this experiment the reduction was carried out at temperatures 5 to 10° lower than in Example 1 and the total organic layer comprised about 75% ester content (secondary butyl acetate) as compared to 45% in the initial example.

Example 3

A mixture of 2-methyl-5-ethyltetrahydrofuran, 2-propyl-tetrahydrofuran, 2,4-epoxy heptane and 3,4-epoxy heptane was peroxidized by contact with air at ambient temperatures and treated with an excess of a saturated aqueous ferrous sulfate containing a trace of sulfuric acid. Reaction temperatures in this instance rose to a peak of about 45 to 50° C. A 56% conversion to oxygenated compounds was obtained which comprised heptane-4-one; esters, e.g., sec-butyl propionate, amyl acetate, n-propyl butyrate, butyl propionate and other ketonic products.

Among the oxygenated organic compounds obtained by the described process under the conditions set forth is the corresponding diester which is apparently produced by dimerization of the primary ester product. As an example, when 2,5-dimethyltetrahydrofuran was peroxidized and reduced in accordance with this invention, there was obtained in addition to the secondary butyl acetate, a $C_8$ diol diacetate in about ⅓ the amount of the secondary butyl acetate present. Under the conditions of reaction it is presumed that dimerization of one of the reaction intermediates occurred resulting in the diester as represented by the following equation:

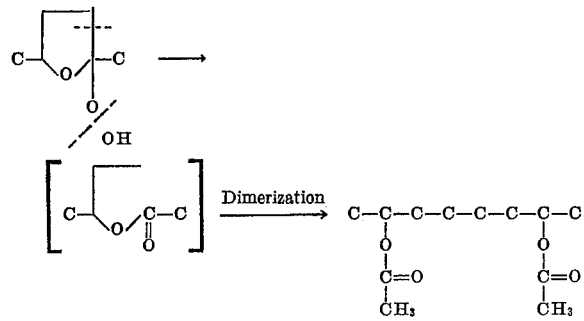

This product was separated by distillation and had a saponification number of 119–120, whereas the calculated value for a $C_8$ diol diacetate is 115. The saponification product appeared to be acetic acid and a glycol, e.g., 2,7-octanediol.

What is claimed is:

1. A process for the production of esters which comprises reacting a compound having the following formula:

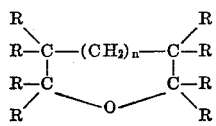

wherein R is selected from the group consisting of hydrogen and alkyl radicals having 1 to 20 carbon atoms, $n$ equals an integer of 0–1 and at least one of the alpha carbon atoms contains a tertiary hydrogen atom, with an oxidizing reagent until no more than about 30% of said compound is converted to an organic peroxide of the following formula:

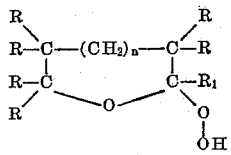

wherein R is selected from the group consisting of hydrogen and alkyl radicals, $n$ equals an integer from 0–1 and $R_1$ is an alkyl group, contacting the resulting organic peroxide containing mixture with a reducing agent to produce a saturated acyclic ester having the same number of carbon atoms as said compound.

2. A process for the preparation of acyclic esters from a heterocyclic compound which consists essentially of reacting a methyl substituted tetrahydrofuran containing a tertiary hydrogen atom attached to one of the alpha carbon atoms with an oxidizing agent until no more than 30% of said methyl substituted tetrahydrofuran is converted to the corresponding hydroperoxide, reacting the resulting hydroperoxide-containing mixture with ferrous sulfate to produce a saturated acyclic ester having the same number of carbon atoms as said methyl substituted tetrahydrofuran.

3. A process according to claim 2 in which the methyl substituted tetrahydrofuran is 2,5-dimethyl tetrahydrofuran.

4. A process for the production of acyclic saturated mono-esters which consists essentially of reacting an epoxy compound having the formula:

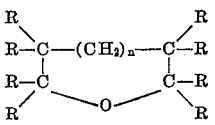

wherein R is selected from the group consisting of hydrogen and $C_1$ to $C_{20}$ alkyl radicals, $n$ equals an integer of 0–1 and at least one of the alpha carbon atoms contains a tertiary hydrogen atom, with an oxygen-containing gas at about 0° to 100° C. until up to about 30 weight percent of said epoxy compound is converted to an organic peroxide of the following formula:

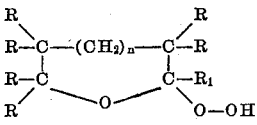

wherein R is selected from the group consisting of hydrogen and $C_1$ to $C_{20}$ alkyl radicals, $n$ equals an integer of 0–1 and $R_1$ is a $C_1$ to $C_{20}$ alkyl radical, contacting the resulting organic peroxide-epoxy compound mixture with an excess of an aqueous ferrous sulfate solution at about 0° to 100° C. to produce a saturated acyclic mono-ester, separating the organic layer from the aqueous layer and recovering said ester from the organic layer.

5. A process in accordance with claim 2 wherein said oxidizing agent is an oxygen-containing gas and said ferrous sulfate is in the form of an aqueous ferrous sulfate solution.

6. A process in accordance with claim 2 wherein the methyl substituted tetrahydrofuran is reacted with air until no more than about 15% of said methyl substituted tetrahydrofuran is converted to the corresponding hydroperoxide.

7. A process for the production of esters which comprises reacting a compound having the formula:

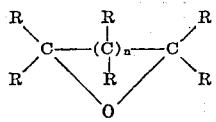

wherein R is selected from the group consisting of hydrogen and alkyl radicals having 1 to 20 carbon atoms, $n$ equals an integer of 0–6 and at least one of the alpha carbon atoms contains a tertiary hydrogen atom, with an oxidizing reagent until no more than about 30% of said compound is converted to an organic peroxide, contacting the resulting organic peroxide-containing mixture with a reducing agent to produce a saturated acyclic ester having the same number of carbon atoms as said compound.

References Cited in the file of this patent

UNITED STATES PATENTS 2,820,813    Smith _____ Jan. 21, 1958

FOREIGN PATENTS 614,392    Great Britain _____ Dec. 15, 1948